US010203677B2

(12) United States Patent
Pichler et al.

(10) Patent No.: US 10,203,677 B2
(45) Date of Patent: Feb. 12, 2019

(54) APPARATUS FOR CHECKING A STATE OF A MACHINE PART

(71) Applicant: ENGEL AUSTRIA GmbH, Schwertberg (AT)

(72) Inventors: Kurt Pichler, Tollet (AT); Johannes Klinglmayr, Kirchdorf (AT); Friedrich Johannes Kilian, Neuhofen (AT); Reimar Pfeil, Bad Hall (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 64 days.

(21) Appl. No.: 15/342,505

(22) Filed: Nov. 3, 2016

(65) Prior Publication Data

US 2017/0131694 A1     May 11, 2017

(30) Foreign Application Priority Data

Nov. 5, 2015   (AT) .................................. A 710/2015

(51) Int. Cl.
    *G06F 19/00*       (2018.01)
    *G05B 19/048*      (2006.01)
    (Continued)

(52) U.S. Cl.
    CPC .......... *G05B 19/048* (2013.01); *B29C 45/768* (2013.01); *B29C 45/78* (2013.01);
    (Continued)

(58) Field of Classification Search
    CPC .............................................. G05B 19/41875
    (Continued)

(56) References Cited

U.S. PATENT DOCUMENTS

| 3,750,134 A   | 7/1973 | Weisend |
| 3,935,675 A * | 2/1976 | Price ........................ B24B 5/42 |
|               |        | 451/249 |

(Continued)

FOREIGN PATENT DOCUMENTS

| AT | 13 307    | 10/2013 |
| CN | 101696906 | 4/2010  |

(Continued)

OTHER PUBLICATIONS

Martin et al, Application of Statistical Moments to Bearing Failure Detection, Apr. 20, 1994, University of Waterloo, pp. 11.*

(Continued)

*Primary Examiner* — Suresh Suryawanshi
(74) *Attorney, Agent, or Firm* — Wenderoth, Lind & Ponack, L.L.P.

(57) ABSTRACT

Apparatus for checking a state of a machine part of a shaping machine, comprising an evaluation unit, at least one power loss sensor for ascertaining a power loss measurement signal which is representative of a power loss in and/or at the machine part, and at least one movement sensor for ascertaining a movement measurement signal which is representative of a movement of the machine part, wherein the evaluation unit is adapted to compute a damage indicator for the machine part from the power loss measurement signal and from the movement measurement signal.

33 Claims, 5 Drawing Sheets

(51) Int. Cl.
  *B29C 45/76*   (2006.01)
  *B29C 45/78*   (2006.01)
  *G05B 19/406*  (2006.01)
  *B29C 45/80*   (2006.01)

(52) U.S. Cl.
  CPC ........ *G05B 19/406* (2013.01); *B29C 45/7666* (2013.01); *B29C 45/80* (2013.01); *B29C 2945/7604* (2013.01); *B29C 2945/76026* (2013.01); *B29C 2945/76083* (2013.01); *B29C 2945/76163* (2013.01); *B29C 2945/76933* (2013.01); *B29C 2945/76936* (2013.01); *G05B 2219/37234* (2013.01); *G05B 2219/37256* (2013.01); *G05B 2219/50083* (2013.01)

(58) Field of Classification Search
  USPC ......................................................... 700/109
  See application file for complete search history.

(56) References Cited

U.S. PATENT DOCUMENTS

| | | | | |
|---|---|---|---|---|
| 5,058,434 | A  * | 10/1991 | Zaschel ................. | G01N 29/12 340/682 |
| 5,062,785 | A  * | 11/1991 | Stroud, III .............. | B29C 45/76 264/40.5 |
| 5,566,092 | A    | 10/1996 | Wang et al. | |
| 5,993,039 | A  * | 11/1999 | Crill ........................ | G05B 9/02 700/292 |
| 6,840,082 | B2 * | 1/2005  | Evans ..................... | G01N 19/02 73/10 |
| 7,328,081 | B2 * | 2/2008  | Kluft .................. | G05B 19/4065 700/175 |
| 7,495,759 | B1 * | 2/2009  | Cheng .................. | B23D 59/001 356/237.1 |
| 7,860,663 | B2 * | 12/2010 | Miyasaka .............. | G01H 1/003 702/113 |
| 8,522,604 | B2 * | 9/2013  | Zhe ....................... | G01M 13/02 324/204 |
| 2004/0182183 | A1 * | 9/2004 | Brand ................. | G01M 13/045 73/865.9 |
| 2008/0111264 | A1 | 5/2008 | Esser | |
| 2016/0342142 | A1 * | 11/2016 | Boeck .................... | B24B 55/00 |

FOREIGN PATENT DOCUMENTS

| | | |
|---|---|---|
| CN | 104977047 | 10/2015 |
| DE | 44 47 288 | 7/1995 |
| DE | 10 2014 104 637 | 10/2015 |
| EP | 2 244 080 | 10/2010 |
| GB | 1 381 288 | 1/1975 |

OTHER PUBLICATIONS

Search Report dated Sep. 1, 2016 in Austrian Application No. 710/2015, with English translation.
Wissenschaftliche Arbeit, "Kugelgewindetriebe im Einsatz an Kunststoffspritzgiessmaschinen—Lebensdauerprognose und Optimierung", von Forstmann 2010 (cited in specification).
Artikel, "Sensorlose Maschinenzustandsüberwachung", von Weck (in VDI-Z integrierte Produktion 142(6), seiten/artikel-Nr. 53-58, 2000, Impressum Düsseldorf: Springer-VDI-Verl. ISSN 0042-1766) (cited in specification).
Search Report dated Sep. 10, 2018 in Chinese Application No. 201611272953.9.

* cited by examiner

APPARATUS FOR CHECKING A STATE OF A MACHINE PART

BACKGROUND OF THE INVENTION

1. Field of the Invention

The invention concerns an apparatus for checking a state of a machine part of a shaping machine. In addition, the invention concerns a shaping machine having such an apparatus and a method of checking the state of a machine part of a shaping machine, in particular with such an apparatus.

2. Description of the Related Art

In the most widely varying areas of industry, in particular in the field of large-scale machines like for example shaping and molding machines, operation can involve the occurrence of damage in relatively heavily loaded machine parts. If excessive damage is not detected in good time other parts which are actually not yet damaged or scarcely damaged can also be affected. That can lead to high costs.

For that reason efforts have already been made to provide for early detection of damage in the machine parts so that suitable measures can be taken in good time, for example the damaged machine part is replaced prior to a major defect which is to be expected.

For that purpose it is known from the article "Sensorlose Maschinenzustandsüberwachung" by Weck (in VDI-Z integrierte Produktion 142(6), pages/Article No: 53-58 2000, Impressum Düsseldorf: Springer-VDI-Verl. ISSN 0042-1766) that breakdowns in the case of machine tools are particularly frequently caused by the failure of mechanical components of the drive train. In accordance with the Article continuous monitoring of the machine state is provided for that purpose. For example damage in main spindle bearings can be detected by way of their temperature characteristics. Otherwise, in accordance with that Article, a good correlation between the variation in the displacement force of a failed guide carriage with that of the motor current can be established. In that way sensor-less state monitoring operating on the basis of the motor current of the feed drive (corresponds to the machine part) is possible. That is therefore implemented primarily with a pure software application. A disadvantage in that respect is that the motor current provides a relatively inaccurate representation of a damage. Thus the damage which can be read out of the motor current can involve relatively great differences in relation to the actually occurring damage. Accordingly the machine part can be replaced unnecessarily early or indeed excessively late.

The scientific work "Kugelgewindetriebe im Einsatz an Kunststoffspritzgiessmaschinen—Lebensdauerprognose and Optimierung" by Forstmann dating from the year 2010 sets forth test series in which the temperature and the vibration (structure-borne sound) of a machine part are recorded at the same time. In that respect, load data, geometry data, material, surface and substance properties or the wear limit (loss of material at the component surface) are utilized as input parameters for a service life prognosis model (see point 4.1). An essential recognition in that work is that the wear of the ball screw drive is critically related to the degree of contamination of the lubricant with particles that have an abrasive action, and temperature (see point 4.4.9). It is stated in point 4.4.9.1 that a damage parameter can be notionally considered as the total of individual sub-factors which provide the damage parameter in accordance with a mathematical interlinkage to be selected. Breakdown criteria for ball screw drives are set out in point 5.3.2.5. As ball screw drives on plastic processing machines are not monitored in operational practice unexpected breakdowns frequently occur as the wear rate as from the moment of damage being rendered audible to the machine operator is already so great that most of the time there are only short remaining operating periods still available. For monitoring the state of series-production machines in manufacture it is desirable for cost reasons to manage without additional sensors. An approach to solving that problem is the evaluation of the drive data, in particular the data present in the frequency converter. It is further described that, besides the drive torque, further measurement data are recorded by the test stand, which data can be used for determining the breakdown time of the ball screw drive. The temperature at the outside of the nut in conjunction with the ambient temperature is an integral measurement in respect of the frictional work involved, which increases with increasing wear of the ball screw drive. In the investigations which were carried out in accordance with that scientific work neither the practical suitability for operational monitoring on series-production machines nor the costs of the diagnostic methods were in the foreground, but rather the early detection of damage. Finally the Summary in point 8 states that the prognosis model produced is capable of individually determining the damage for any region of the ball screw drive, both in terms of fatigue wear and also abrasive wear.

A disadvantage with that scientific work is that it was only carried out on the basis of theoretical considerations or with a test arrangement which is unsuited to practical purposes. In addition there is the disadvantage that temperature and vibration (structure-borne sound) were simultaneously recorded, but no set of rules is laid down for any kind of merging of the measurement data. Accordingly it is not possible on the basis of that work to achieve in practice a quick and informative result.

SUMMARY OF THE INVENTION

The object of the present invention is therefore that of providing an apparatus which is improved over or is an alternative to the known state of the art and an improved method. In particular the invention seeks to overcome the disadvantages known from the state of the art.

In accordance with a first aspect of the present invention that is achieved by an apparatus including an evaluation unit, at least one power loss sensor for ascertaining a power loss measurement signal which is representative of a power loss in and/or at the machine part, and at least one movement sensor for ascertaining a movement measurement signal which is representative of the movement of the machine part, wherein the evaluation unit is adapted to compute a damage indicator for the machine part from the power loss measurement signal and from the movement measurement signal.

It is thus possible for the first time to merge values which reproduce the damage highly precisely (at least power loss measurement signal and movement measurement signal) to give a single informative value (damage indicator). That means that the operator is afforded a quick, well-founded and informative basis for making a decision about replacement of a machine part. In other words, the invention is based on the merging of a plurality of indicators in the measurement values to give a global damage indicator. The residual service life of the machine part is then afforded in relation to the service life specification from the manufacturer. If the damage indicator is just below the service life specification or reaches same then the machine part should be replaced.

The term power loss is used to denote the difference between consumed power (power input) and power delivered in the desired form (power output) of a device or process. Power loss is produced predominantly in the form of heat flow and can therefore be ascertained by way of temperature measurement. In addition, the power loss can also be calculated as the difference between the supplied electrical power and the delivered mechanical power. That affords a virtual sensor signal. If the mechanical power output cannot be measured directly the power loss can however also be implemented purely by way of monitoring of the motor power. More specifically, if that motor power continuously rises with a process remaining the same then the additionally supplied power must be budgeted as a loss.

To achieve even more precise information about the damage actually present in the machine part a wear sensor, preferably a particle counter or an oil condition sensor is provided to ascertain the wear of the machine part, wherein that ascertained wear can be communicated as a wear measurement signal to the evaluation unit which additionally takes account of that wear measurement signal for calculating the damage indicator. In specific terms for example a wear sensor can be used, which is an intelligent sensor for determining the condition of hydraulic and lubrication systems on the basis of ferromagnetic wear particles. That sensor is in the form of a screw-in or insert-type sensor and is designed for continuously monitoring the ferromagnetic contamination in the oil.

Instead of or in addition to that ascertained wear which is caused by operational use however it is also possible for aging—that is to the period since the machine part was brought into operation—to be incorporated into the calculation of the damage indicator. Such aging in fact also occurs in non-use conditions, that is to say purely due to the passage of time. In other words therefore the pure age of the machine part can also form a calculation factor in respect of the damage indicator.

In accordance with a second aspect the object of the present invention is also attained by an apparatus having an evaluation unit and a wear sensor for ascertaining the wear of the machine part, wherein a wear measurement signal which is representative of the ascertained wear can be communicated to the evaluation unit and wherein the evaluation unit is adapted to calculate a damage indicator for the machine part from the wear measurement signal. The wear sensor is preferably in the form of a particle counter for ascertaining the number of (wear) particles in the lubricant.

In this second aspect, the apparatus can additionally preferably have at least one power loss sensor for ascertaining a power loss measurement signal which is representative of a power loss in and/or at the machine part, and/or at least one movement sensor for ascertaining a movement measurement signal which is representative of a movement of the machine part, wherein the evaluation unit is adapted to calculate a damage indicator for the machine part from the power loss measurement signal and/or from the movement measurement signal together with the wear measurement signal.

All preferred embodiments by way of example or possible variants as set forth in the appendant claims or in the specific description apply—as is logically meaningful—to both specified aspects of the invention.

In principle, any machine part can be examined for damage with the described apparatus. Preferably such a machine part performs movements, and for that reason wear naturally occurs due to the movement. The use of such an apparatus is particularly appropriate for checking a state of an in particular oil-lubricated machine part when that machine part is a drive unit. That can be for example a piston-cylinder unit or a belt drive. Particularly preferably however the apparatus is used to check a machine part in the form of a transmission, preferably a ball screw drive, for example for use in a closing unit of a molding machine. Such a ball screw drive has a spindle, a spindle nut and preferably ball-shaped rolling bodies arranged therebetween. As such ball screw drives operate precisely and damage can give rise to high costs the described apparatus can be particularly efficiently used in relation to such ball screw drives. Instead of being used in ball screw drives the described apparatus can also be used in relation to spur gears, planetary transmissions, racks, bearings and so forth. The power loss sensor or temperature sensor can be integrated in the wear sensor. Those two sensors can therefore form one unit.

It is in principle sufficient if the power loss is ascertained on the basis of a single power loss sensor. In order however to achieve a still more informative value there is preferably provided an ambient temperature sensor for measuring the ambient temperature in the region of the shaping machine, wherein that ambient temperature can be communicated as an ambient temperature measurement signal to the evaluation unit, wherein the evaluation unit corrects the power loss measurement signal with the ambient temperature measurement signal to give a cleaned temperature measurement signal. Thus an excessively cool or excessively high ambient temperature or temperature fluctuations which are dependent on the time of day cannot undesirably falsify the actual power loss.

The movement sensor can be in the form of a vibration sensor or a speed sensor. Preferably the movement sensor is in the form of an acceleration sensor which measures the second time derivative of the position of the machine part. The movement sensor can also include one or more of those sensors. The acceleration sensor is particularly well suited to outputting different vibration frequency ranges as frequency bands. Particularly relevant features of those frequency bands are frequency peaks or pulse signals. Those features are suited to ascertaining a chipping indicator. Additionally or alternatively however measurement values of the wear sensor can also be incorporated into ascertaining the chipping indicator.

The friction indicator forms a further sub-indicator of the damage indicator. That can be calculated by way of the evaluation unit from the power loss measurement signal, preferably from the cleaned temperature measurement signal. An abrasive wear indicator is in turn calculated from the movement measurement signal by way of the evaluation unit. Thus the damage indicator is composed of the chipping indicator, the friction indicator and the abrasive wear indicator.

For calculating the damage indicator, however, it is possible not only to use information from the sensors of the apparatus, but rather it is even advantageous if the evaluation unit additionally receives at least one electrical signal of the shaping machine. That at least one electrical signal of the shaping machine can represent for example a position and/or a direction of movement of the machine part of the shaping machine. This means, if a particularly force-intensive cycle section is just being implemented the measurement results are to be correspondingly adapted thereto. In particular increased vibration can occur at such a moment in the cycle, which vibration however does not signify any conclusion about increased damage. By virtue of the information about the position and/or the direction of movement of the machine part those values can be suitably taken into consideration or filtered out.

It is also possible that the at least one electrical signal of the shaping machine represents a temperature of a part, for example a spindle, of the shaping machine, and that signal is also incorporated into ascertainment of the power loss. Thus a signal which is present in any case in the shaping machine can also be used for more precise ascertainment of the power loss. More specifically the power loss is thus composed of the power loss measurement signal (which for example corresponds to the lubricating oil temperature), the electrical signal representing the spindle temperature and the ambient temperature measurement signal representing the ambient temperature.

Protection is also claimed for a shaping machine, in particular an injection molding machine or injection press, having an apparatus according to the invention. In that respect it is preferably provided that the shaping machine has an open-loop or closed-loop control unit in signal-transmitting relationship with the evaluation unit for open-loop or closed-loop control of the shaping machine. The evaluation unit can also be integrated into the open-loop or closed-loop control unit. More especially the evaluation unit can be a program stored in the open-loop or closed-loop control unit.

It is in principle possible for the open-loop or closed-loop control unit to provide for open-loop or closed-loop control of the shaping machine in dependence on the damage indicator communicated by the evaluation unit to the control unit, for example the machine part can be brought to a stop at a corresponding value or can even be entirely shut down upon the attainment of a predetermined threshold value for the damage indicator. In general it can be provided that open-loop or closed-loop control is to be implemented in a more careful fashion in the case of a detected damage in order to prevent or at least delay more extensive damage. For example operation can involve lower levels of acceleration or jerks.

It is preferably provided that a warning signal can be output by way of the open-loop or closed-loop control unit in dependence on the damage indicator communicated by the evaluation unit to the control unit, when the communicated damage indicator reaches a set threshold value. That warning signal can be output for example acoustically. The current value of the damage indicator and/or the warning signal can however also be communicated back to the open-loop or closed-loop control unit or passed by way of an optional network connection to a remote maintenance station (for example a service center or the like). Preferably the damage indicator is displayed (for example as a numerical value) by way of a display device. That display device can be part of the evaluation unit. It is however also possible for the display device which is generally present in any case (monitor screen) of the open-loop or closed-loop control unit of the shaping machine to be used for that purpose.

Protection is additionally also claimed for a method of checking a state of a machine part of a shaping machine, in particular with an apparatus according to the first aspect. In that case the method involves the steps of ascertaining a power loss in and/or at the machine part, ascertaining a movement of the machine part and calculating a damage indicator for the machine part by the evaluation unit from the power loss and from the movement. Expressed in greater detail the steps are ascertaining a power loss in and/or at the machine part with a power loss sensor, that ascertained power loss being communicated as a power loss measurement signal to an evaluation unit, ascertaining a movement of the machine part with a movement sensor, that ascertained movement being communicated as a movement measurement signal to the evaluation unit, and calculating a damage indicator for the machine part by the evaluation unit from the power loss measurement signal and from the movement measurement signal.

Preferably the method also includes the further step of ascertaining a wear of the machine part with a wear sensor, that ascertained wear being communicated as a wear measurement signal to the evaluation unit which additionally takes account of that wear measurement signal for calculating the damage indicator.

Protection is also claimed for a method of checking a state of a machine part of a shaping machine, in particular with an apparatus according to the second aspect. In that respect the method comprises the steps of ascertaining a wear of the machine part and calculating a damage indicator for the machine part by an evaluation unit from the ascertained wear. In addition preferably the method can comprise the steps of ascertaining a power loss in and/or at the machine part and/or ascertaining a movement of the machine part and calculating a damage indicator for the machine part by the evaluation unit, wherein in addition the power loss and/or the movement is taken into consideration for calculation of the damage indicator.

All possible embodiments by way of example set forth in respect of the apparatus and the shaping machine correspondingly also apply as possible or preferred variants of the method of checking a state of a machine part of a shaping machine.

BRIEF DESCRIPTION OF THE DRAWINGS

Further details and advantages of the present invention are described more fully hereinafter by means of the specific description with reference to the embodiments by way of example illustrated in the drawings in which.

DETAILED DESCRIPTION OF THE INVENTION

Figure 1:
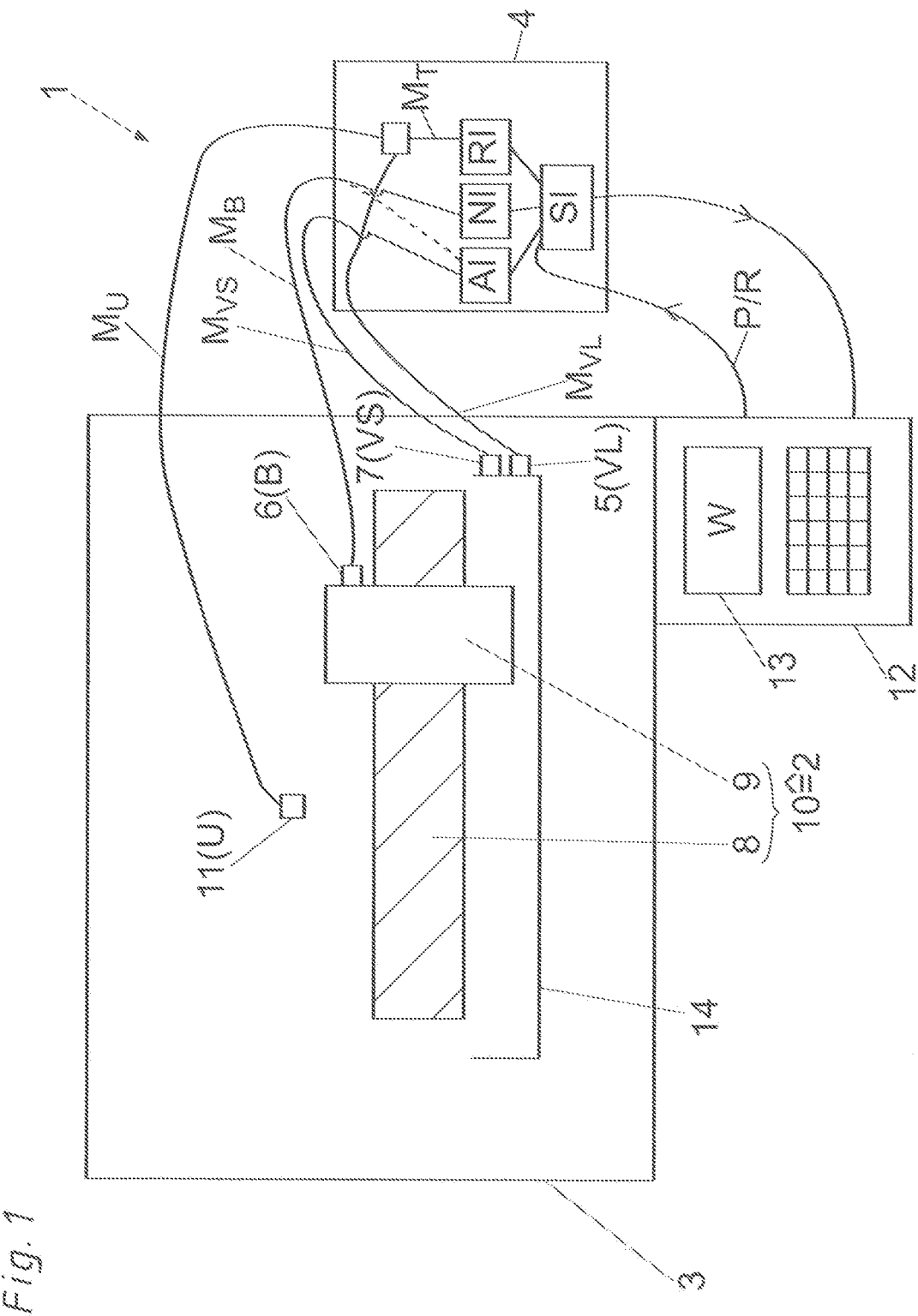
FIG. 1 diagrammatically shows a shaping machine with an apparatus for checking a state of a machine part.

FIG. 1 diagrammatically shows a shaping machine 3. It has a ball screw drive 10 as a (at least one) machine part 2. The ball screw drive 10 is composed of the spindle 8 and the spindle nut 9. An oil sump 14 is disposed beneath the ball screw drive 10. Provided in the region of that oil sump 14 is a power loss sensor 5 for ascertaining a power loss VL. More specifically that power loss sensor 5 can be a thermometer for ascertaining the oil temperature. A power loss measurement signal $M_{VL}$ is passed from the power loss sensor 5 to an evaluation unit 4. Also provided in the region of the oil sump 14 is a wear sensor 7 for ascertaining the wear VS of the machine part 2. More specifically that wear sensor 7 can be a particle counter or an oil condition sensor. In detail there is provided an apparatus with which the (number of) ferromagnetic particles in the lubricant or lubricating agent are ascertained. From the wear sensor 7 a wear measurement signal $M_{VS}$ is also passed to the evaluation unit 4. A movement sensor 6 for ascertaining a movement B of the machine part 2 is arranged in or at the machine part 2. More specifically that movement sensor 6 can be an acceleration sensor for ascertaining frequency bands. A movement measurement signal $M_B$ is also communicated to the evaluation unit 4 from the movement sensor 6. An ambient temperature sensor 11 can also be provided to measure the ambient temperature U and to pass a corresponding ambient temperature measurement signal $M_U$ to the evaluation unit 4.

Subsequently a damage indicator SI is calculated in the evaluation unit 4 from those input signals, which damage indicator permits (relatively) accurate information about the actually prevailing damage to the machine part 2. For that purpose firstly the power loss measurement signal $M_{VL}$ and the ambient temperature measurement signal $M_U$ are brought together to give a cleaned temperature measurement signal $M_T$. A friction indicator RI is then calculated from that cleaned temperature signal $M_T$ in the evaluation unit 4 by way of a stored algorithm. A wear indicator NI is calculated from the movement measurement signal $M_B$ in the evaluation unit 4. The chipping indicator AI is calculated from the wear measurement signal $M_{VS}$ in the evaluation unit 4. Additionally or alternatively that chipping indicator AI can also be calculated from the frequency peaks or pulse signals of the frequency bands of the movement sensor 6 (see the broken line in FIG. 1). Finally, the damage indicator SI is calculated on the basis of an algorithm stored in the evaluation unit 4 from at least one those indicators—preferably from all three indicators—friction indicator RI, wear indicator NI and chipping indicator AI. FIG. 1 only shows the power loss by virtue of a temperature signal, in actual fact the power loss however can also be ascertained from the additionally consumed drive power.

That damage indicator SI is then compared to the service life specification of the manufacturer of the machine part 2 whereby the (probable) remaining service life is established. If no manufacturer specifications are available then a moment in time for the prognosticated breakdown (SI=1) can be specified by way of the rise in the damage indicator. That damage indicator SI (or the remaining service life derived therefrom) can then be displayed by way of a display device. More especially that can be effected by way of the display device 13 (screen) of the open-loop or closed-loop control unit 12 of the shaping machine 3. It is however also possible for the damage indicator SI to be output when a limit value is exceeded in the form of an acoustic or optical warning signal W, preferably by way of the display device 13. It is also possible for the open-loop or closed-loop control unit to provide for open-loop or closed-loop control of the shaping machine 3 in dependence on the damage indicator SI communicated by the evaluation unit 4 to the open-loop or closed-loop control unit 12, preferably shutting down the machine part 2, braking it or limiting certain movements. At least one value which originates directly from the shaping machine 3 or its open or closed-loop control unit 12 can also be involved in the calculation of the damage indicator SI. For example at least one electrical signal of the shaping machine 3 can represent a position P and/or a direction of movement R and/or a power consumption of the machine part 2.

In FIG. 1 the movement sensor 6 and the power loss sensor 5 are arranged or provided separately from the evaluation unit 4. As a difference from the illustrated case, those sensors can also be part of the evaluation unit 4.

Figure 2:
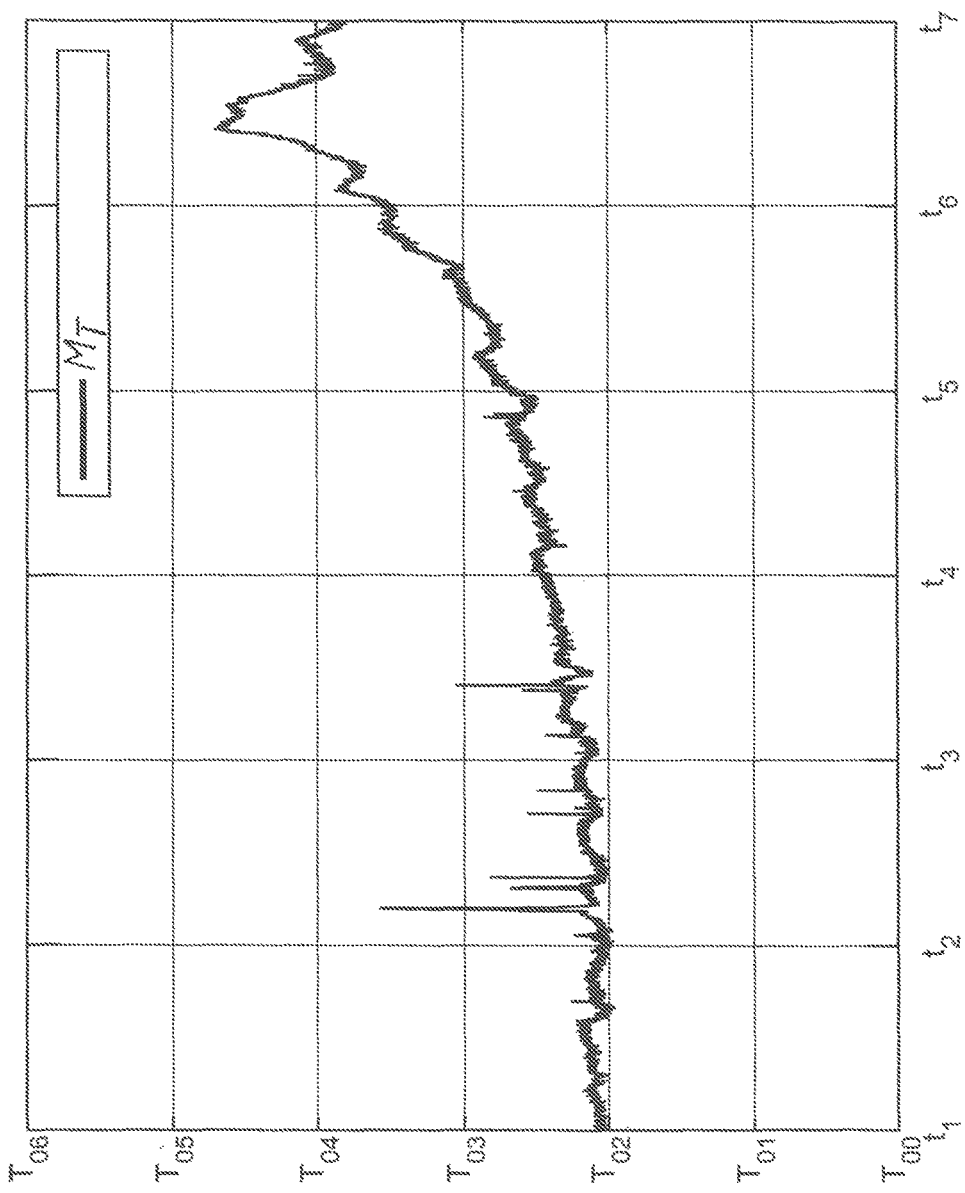
FIG. 2 shows a graph of the power loss of the machine part along a time axis.

FIG. 2 shows a graph illustrating the cleaned temperature $M_T$. It will be seen from FIG. 2 that the power loss VL increases almost monotonically (or steadily) and only (slightly) collapses again at the end. For detection of the damage indicator SI it is sufficient if in a certain interval the cleaned temperature $M_T$ exceeds a static value dependent on the interval (scatter, mean value, median, etc.). (In that respect reference can already first be made to FIG. 4: as the cleaned temperature $M_T$ collapses again shortly before the time $t_6$ the value for the friction indicator RI is also taken back).

Figure 3:
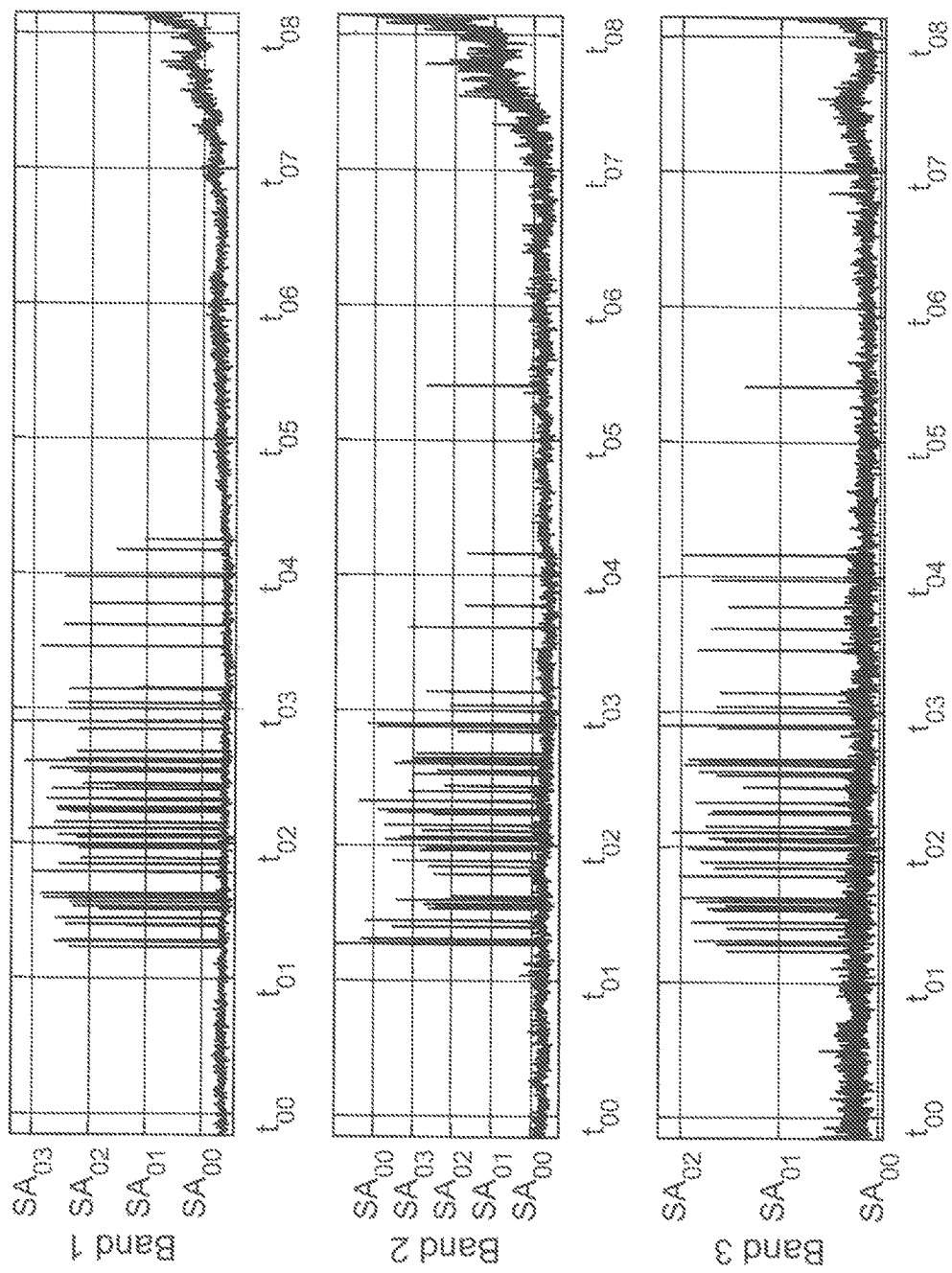
FIG. 3 shows a graph of frequency bands recorded by way of the acceleration sensor along a time axis.

FIG. 3 shows three graphs illustrating the signal amplitudes SA measured by way of the acceleration sensor in various frequency ranges. In this respect various frequency bands (band 1, band 2 and band 3) are considered or investigated in isolation.

Figure 4:
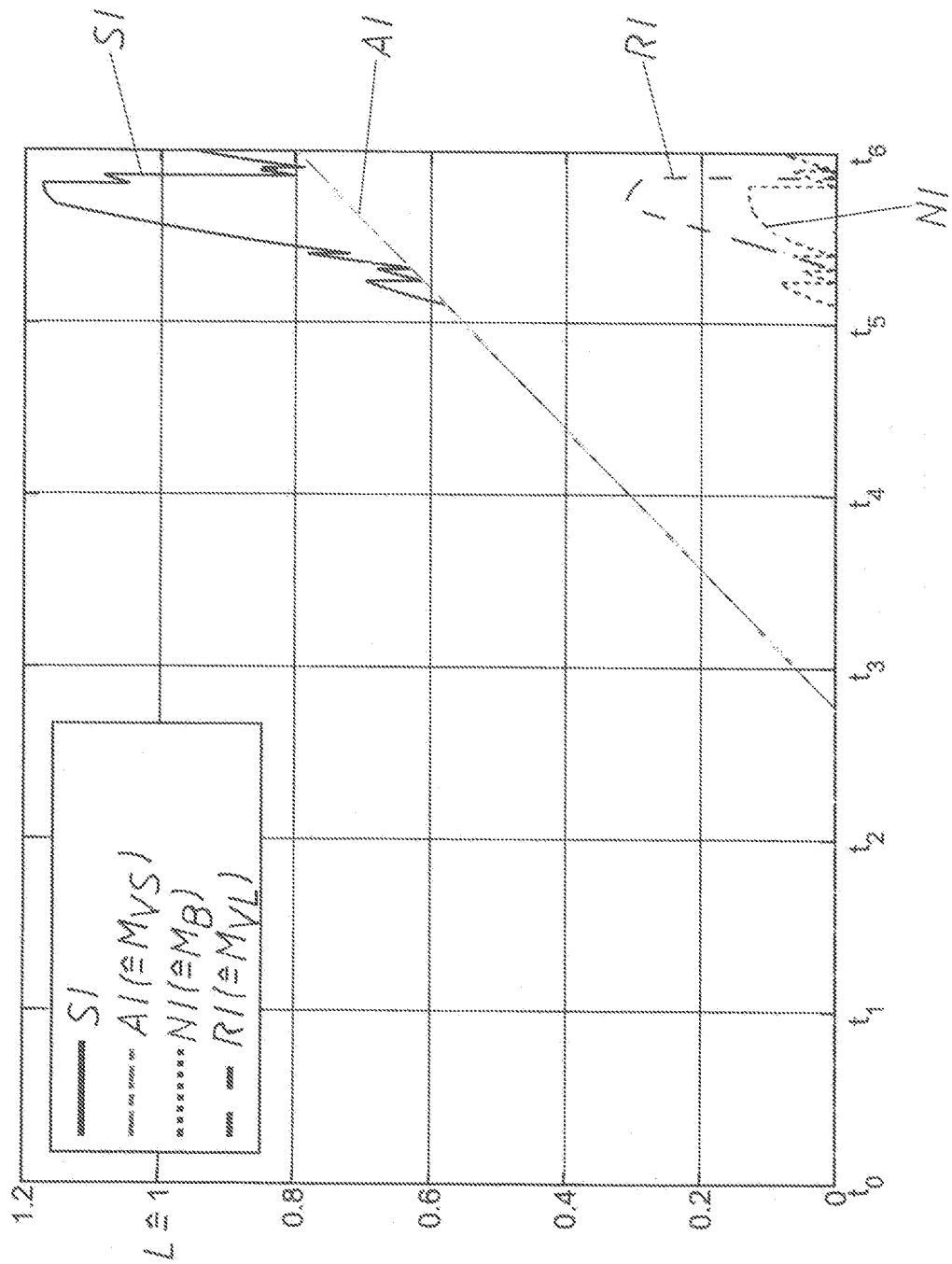
FIG. 4 shows a graph with the composition of the damage indicator along a time axis.

In FIG. 4 the various indicators are plotted along the time axis t. At the end of the time axis (fairly accurately between $t_5$ and $t_6$) the chipping indicator AI which (in this case) steadily increases, the friction indicator RI and the wear indicator NI are totaled to give a damage indicator SI which from then is above the threshold value L. In the present example that corresponds to a total breakdown. That evaluation of a measurement data set on a ball screw drive test stand extended over a sufficiently large number of test cycles, the number of test cycles corresponding to an average service life of the ball screw drive. In that case the ball screw drive was severely worn or no longer usable at the end. A marked rise in temperature (greater friction), individual frequency peaks (chips) and at the end a general rise in vibration (abrasion wear) can be seen. The rise in the damage indicator SI can be used to already conclude relatively early about the breakdown time $t_{breakdown}$ (corresponds to the time $t_6$ or the attainment of the threshold value L). In actual operation countermeasures can already be taken here or maintenance measures can be planned.

Figure 5:
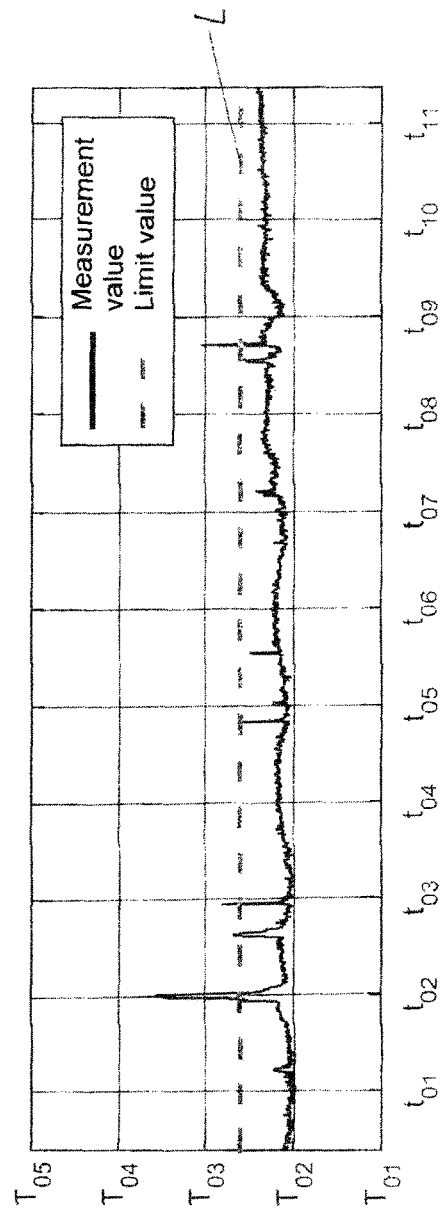
FIG. 5 shows a graph of the power loss measurement signal with threshold value.

FIG. 5 shows a pattern of a recording of a signal by a temperature sensor which has quite a number of peaks (that is to say abrupt rises and falls over a sufficiently smooth signal configuration). It is only when such a signal peak exceeds the limit value marked in broken line that this acts on the influencing function shown in FIG. 6. In general it is to be noted that the probability of effect after the occurrence of an indicator event can also decrease again.

Figure 6:
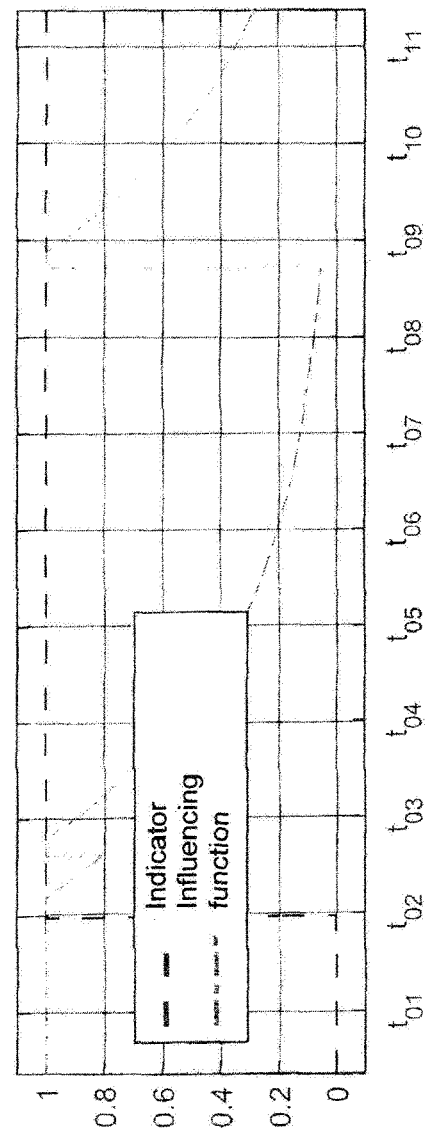
FIG. 6 shows corresponding to FIG. 5 a graph of the damage indicator with an influencing function.

FIG. 6 shows an example of the probability of an effect in relation to the friction indicator. After the machine part temperature exceeds the predefined limit value it quickly decreases again. After it falls below the limit value the probability of effect exponentially falls. After the machine part temperature exceeds the predefined limit value (shown in FIG. 5) the influencing function is set to 1, that is to say the indication has an influence on the overall indicator (see FIG. 4 after time $t_5$). When the limit value is first exceeded therefore the indicator is set to 1 to establish the onset of that event. If the temperature falls below the limit value again the influence is not set to 0 but it begins to fall in accordance with an exponential function. The post-action time of a damage event is modeled in that way. Before the times $t_{03}$ and $t_{09}$ the limit value is exceeded again, for which reason the influencing function is set to 1 again.

Finally it is to be noted that a substantial innovation is the combination of power loss and movement (vibration). In addition no attempt is made to simulate an exact mechanical or thermal model but the frequency bands are analyzed in respect of a continuous rise (abrasion wear) or individual swings (chipping). A measurement result by way of example in respect of a ball screw drive test stand is shown in FIG. 4. It will be clearly seen that wear is already established at an early time (in the specific case several weeks before the actual breakdown) and thus the breakdown can be predicted.

Further measurements have shown that the merging of temperature and vibration does not necessarily have to be sufficient as in some tests in spite of massive damage to the ball screw drive the damage indicator SI did not increase. Therefore the use of the wear sensor is additionally recommended. That provides an output signal proportional to the number of ferromagnetic particles. As these occur even with slight wear on the ball screw drive that sensor value further improves the damage indicator.

LIST OF REFERENCES 1 apparatus
2 machine part
3 shaping machine
4 evaluation unit
5 power loss sensor
6 movement sensor
7 wear sensor
8 spindle
9 spindle nut
10 ball screw drive
11 ambient temperature sensor
12 open-loop or closed-loop control unit
13 display device
14 oil sump
VL power loss
$M_{VL}$ power loss measurement signal
B movement
$M_B$ movement measurement signal
SI damage indicator
VS wear
U ambient temperature
$M_T$ cleaned temperature measurement signal
$M_U$ ambient temperature measurement signal
RI friction indicator
NI abrasion wear indicator
AI chipping indicator
P position of the machine part
R direction of movement of the machine part
W warning signal
L threshold value
SA signal amplitude

The invention claimed is:

1. An apparatus for checking a state of a machine part of a shaping machine, comprising:
    an evaluation unit,
    at least one power loss sensor for ascertaining a power loss measurement signal which is representative of a power loss in and/or at the machine part, and
    at least one movement sensor for ascertaining a movement measurement signal which is representative of a movement of the machine part,
    wherein the evaluation unit is adapted to calculate a damage indicator for the machine part from the power loss measurement signal and from the movement measurement signal,
    wherein the power loss denotes a difference between power input and power output, and
    wherein the power loss is based on heat flow and is determined by a temperature measurement or is calculated as a difference between supplied electrical power and delivered mechanical power.

2. The apparatus as set forth in claim 1, further comprising a wear sensor, for ascertaining a wear of the machine part and communicating the wear that is ascertained as a wear measurement signal to the evaluation unit which is further adapted to additionally take into account the wear measurement signal for calculating the damage indicator.

3. A molding machine or injection press comprising:
    an apparatus for checking a state of a machine part of the molding machine or injection press,
    an evaluation unit,
    a wear sensor for ascertaining a wear of the machine part and communicating a wear measurement signal which is representative of the wear that is ascertained to the evaluation unit, and
    an open-loop or closed-loop control unit in signal-transmitting relationship with the evaluation unit for open-loop or closed-loop control of the molding machine or injection press,
    wherein the evaluation unit is adapted to calculate a damage indicator for the machine part from the wear measurement signal, and
    wherein the open-loop or closed-loop control unit is adapted to provide for open-loop or closed-loop control of the molding machine or injection press in dependence on the damage indicator communicated by the evaluation unit to the open-loop or closed-loop control unit and is further adapted to provide for possible shutdown of the machine part.

4. The molding machine or injection press as set forth in claim 3, further comprising:
    at least one power loss sensor for ascertaining a power loss measurement signal which is representative of a power loss in and/or at the machine part, and/or
    at least one movement sensor for ascertaining a movement measurement signal which is representative of a movement of the machine part,
    wherein the evaluation unit is further adapted to calculate the damage indicator for the machine part from the power loss measurement signal and/or from the movement measurement signal together with the wear measurement signal.

5. The apparatus as set forth in claim 1, wherein the machine part is a drive unit of the shaping machine.

6. The apparatus as set forth in claim 1, wherein the evaluation unit is further adapted to use the power loss measurement signal for correction of an ambient temperature measurement signal representing an ambient temperature, to obtain a cleaned temperature measurement signal.

7. The apparatus as set forth in claim 6, further comprising an ambient temperature sensor for measuring the ambient temperature and for outputting the ambient temperature measurement signal, wherein the ambient temperature sensor is on the shaping machine or in a region of the shaping machine.

8. The apparatus as set forth in claim 1, wherein the at least one movement sensor is a vibration sensor, a speed sensor or an acceleration sensor.

9. The apparatus as set forth in claim 1, wherein the acceleration sensor is adapted to output different vibration frequency ranges as frequency bands.

10. The apparatus as set forth in claim 9, wherein the evaluation unit is further adapted to calculate a chipping indicator from measurement values of a wear sensor and/or from features of the frequency bands.

11. The apparatus as set forth in claim 1, wherein the evaluation unit is further adapted to calculate a friction indicator from the power loss measurement signal.

12. The apparatus as set forth in claim 1, wherein the evaluation unit is further adapted to calculate an abrasion wear indicator from the movement measurement signal.

13. The apparatus as set forth in claim 1, wherein the damage indicator is composed from a chipping indicator, a friction indicator and an abrasion wear indicator.

14. The apparatus as set forth in claim 1, wherein the evaluation unit is further adapted to additionally calculate the damage indicator from at least one electrical signal of the shaping machine.

15. The apparatus as set forth in claim 14, wherein the at least one electrical signal of the shaping machine represents a position and/or a direction of movement of the machine part.

16. The apparatus as set forth in claim 14, wherein the at least one electrical signal of the shaping machine represents a temperature of a part of the shaping machine and the at least one electrical signal of the shaping machine is also incorporated into the determination or calculation of the power loss.

17. The apparatus as set forth in claim 1, wherein the at least one power loss sensor is a temperature sensor for determining waste heat or a virtual sensor for ascertaining the power loss from the difference between supplied electrical power and delivered mechanical power.

18. A shaping machine comprising the apparatus as set forth in claim 1.

19. The shaping machine as set forth in claim 18, further comprising an open-loop or closed-loop control unit in signal-transmitting relationship with the evaluation unit for open-loop or closed-loop control of the shaping machine.

20. The shaping machine as set forth in claim 19, wherein the open-loop or closed-loop control unit is adapted to provide for open-loop or closed-loop control of the shaping machine in dependence on the damage indicator communicated by the evaluation unit to the open-loop or closed-loop control unit and is further adapted to provide for possible shutdown of the machine part.

21. The shaping machine as set forth in claim 19, wherein the open-loop or closed-loop control unit is adapted to output a warning signal in dependence on the damage indicator communicated by the evaluation unit to the open-loop or closed-loop control unit when the damage indicator that is communicated has reached a fixed threshold value.

22. The shaping machine as set forth in claim 18, further comprising a display device adapted to display the damage indicator.

23. A method of checking a state of a machine part of a shaping machine comprising the apparatus as set forth in claim 1, the method comprising:
ascertaining the power loss in and/or at the machine part,
ascertaining the movement of the machine part, and
calculating the damage indicator for the machine part by the evaluation unit from the power loss and from the movement.

24. The method as set forth in claim 23, further comprising ascertaining a wear of the machine part with a wear sensor, wherein the wear is taken into consideration for calculation of the damage indicator.

25. A method of checking a state of a machine part of the molding machine or injection press as set forth in claim 3, the method comprising:
ascertaining the wear of the machine part, and
calculating the damage indicator for the machine part by the evaluation unit from the wear that is ascertained.

26. The method as set forth in claim 25, further comprising:
ascertaining a power loss in and/or at the machine part, and/or
ascertaining a movement of the machine part, and
calculating the damage indicator for the machine part by the evaluation unit,
wherein, in addition, the power loss and/or the movement is/are taken into consideration for calculation of the damage indicator.

27. The apparatus as set forth in claim 2, wherein the wear sensor is a particle counter or oil condition sensor.

28. The apparatus as set forth in claim 5, wherein the drive unit is a transmission.

29. The apparatus as set forth in claim 5, wherein the drive unit is a ball screw drive.

30. The apparatus as set forth in claim 10, wherein the features of the frequency bands are frequency peaks or pulse signals.

31. The apparatus as set forth in claim 6, wherein the evaluation unit is further adapted to calculate a friction indicator from the cleaned temperature measurement signal.

32. The apparatus as set forth in claim 16, wherein the part of the shaping machine is a spindle of the shaping machine.

33. The shaping machine as set forth in claim 18, wherein the shaping machine is an injection molding machine or injection press.

* * * * *